United States Patent [19]

Fritschen et al.

[11] Patent Number: 5,364,160
[45] Date of Patent: Nov. 15, 1994

[54] OPEN AIR DUCT BICYCLE SADDLE MOUNT

[76] Inventors: Thomas M. Fritschen, 8301 28th Ave. NE., Seattle, Wash. 98115; Richard L. Gerhards, 7205 N. Stanford, Portland, Oreg. 97203-4337

[21] Appl. No.: 22,944

[22] Filed: Feb. 26, 1993

[51] Int. Cl.$^5$ ................................................ B62J 1/08
[52] U.S. Cl. ............................ 297/195.1; 297/215.14; 297/215.15; 280/220; 280/283
[58] Field of Search ........... 297/195.1, 215.14, 215.15; 280/220, 283

[56] References Cited

U.S. PATENT DOCUMENTS

| | | | |
|---|---|---|---|
| 471,417 | 3/1892 | Bunker | 297/195.1 |
| 599,291 | 2/1898 | Brooks | 280/283 |
| 650,941 | 6/1900 | Kramer | 280/283 |

FOREIGN PATENT DOCUMENTS

| | | | |
|---|---|---|---|
| 525291 | of 0000 | United Kingdom | 297/195.1 |
| 19027 | of 1898 | United Kingdom | 297/195.1 |
| 370548 | 4/1932 | United Kingdom | 297/195.1 |

Primary Examiner—Peter R. Brown

[57] ABSTRACT

A low frontal area, aerodynamic drag reducing and adjustable mounting device and bicycle saddle including, an integral saddle or interchangable saddle and fastening mechanism, and a horizontally running open rectangular shaped tube with an over sleeve, the rectangular tube and over sleeve having vertical and horizontal grooves respectively with common fasteners, that allow vertical, horizontal, and inclination adjustments and that are fastened to a bicycle frame.

9 Claims, 3 Drawing Sheets

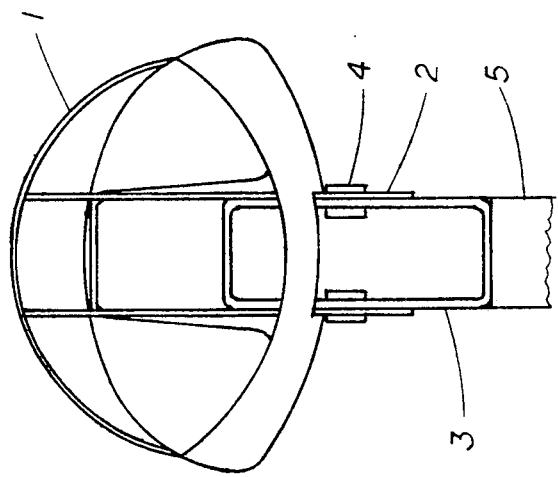
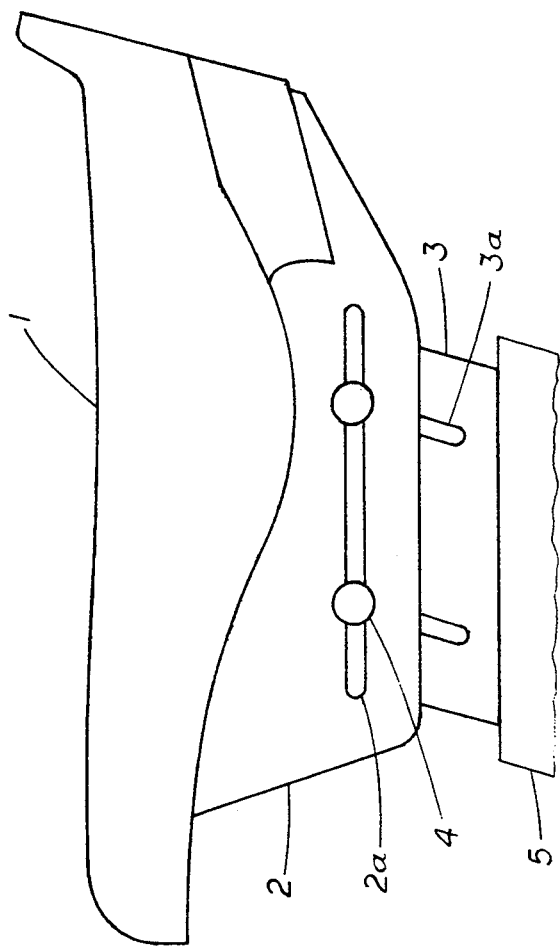
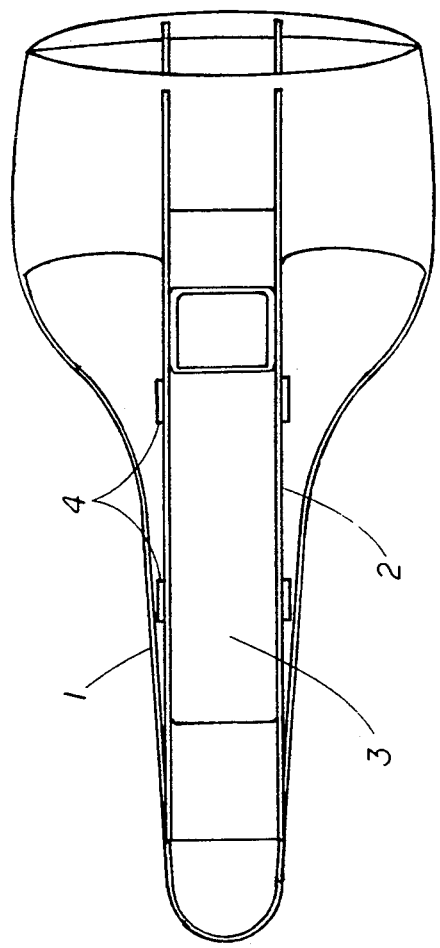

OPEN AIR DUCT BICYCLE SADDLE MOUNT

BACKGROUND OF THE INVENTION

1. Field of the Invention

This invention relates to a low frontal area, air channeling or aerodynamic base drag reducing bicycle saddle and adjustable mounting device. As disclosed, the invention relates particularly to a bicycle mount and saddle, but the application of its open adjustable mounting air channeling portion is not limited thereto.

2. Description of Prior Art

Overcoming aerodynamic drag has been an area of special concern and interest for bicycle frame and component manufacturers, especially where speed is considered to be of great importance, as in competitive cycling. However the problem of reducing aerodynamic drag cannot be adequately addressed apart from mechanical or structural concerns. One reason for this is that the rules that govern competitive cycling have traditionally disallowed any device added to a bicycle, or any part of the bicycle, that has, as its sole function, the reduction of forward air drag. This means that any improvement in the aerodynamic efficiency of a bicycle, as far as competitive cycling is concerned, must serve a structural or mechanical purpose for the bicycle as well, or that its aerodynamic benefits are consequent with its structural features.

In attempts to improve aerodynamic efficiency of bicycle frames, frame builders who use the traditional two triangle frame design that employs a main triangle composed of three brazed, welded, or glued tubes that connect the front fork, saddle, and peddles, with rear triangle affixed thereto, that holds the rear wheel, have made minor variations in the shape and arrangement of frame parts that either reduce frontal area, or smooth air flow around frame parts. The variation in the shape of frame parts includes, for example, reshaping of the vertical frame tubes to a tear drop or oval shape to smooth air flow and reduce base drag; and variations in arrangement include such things as the use of a mono seat stay in the rear triangle above the top of the rear wheel to reduce frontal area, instead of the traditional two stay configuration, sloping the top tube to accomodate the reduction of the height or the frontal area of the head tube, and bending the top tube and/or seat tube to smooth the air flow around these parts and their joints.

Bicycle component manufactures, likewise, have tried to reduce the aerodynamic drag of their components by changing the shape and reducing the frontal area of their parts. For example, the exposed area of a traditionally round seat post would be replaced with a tear drop shape, while the adjustable part that is received into the seat tube remained round.

A traditional bicycle saddle assembly will employ a saddle with two round rods, known as rails, running underneath the length of the saddle, and a seat post with a clamp that grips these rails, and which is received into the seat tube of the frame. The clamp on the seat post usually incorporates an adjustment mechanism for the inclination of the saddle relative to the horizontal plane of the ground, and the clamp can be loosened so the saddle can be moved forward or backward on the rails for adjustment forward and aft on the horizontal plane. Vertical adjustment is achieved by loosening a fastening bolt mechanism, usually permanently affixed to the seat tube of the frame, and then raising or lowering the seat post in the seat tube until the desired height is achieved, and this adjustment is retained by tightening the fastening bolt of the seat tube.

While this system provides adequate saddle adjustment, it was designed for a bicycle frame made of round tubes and requires close fitting parts, usually made of metal, that also serve the structural purpose of retaining lateral stiffness and bearing rider load. The said parts are also relatively expensive, and heavy, and because of their structural and mechanical requirements, they have a considerable frontal area. In addition, reshaping the exposed area of the seat tube to a tear drop or airfoil shape offers only a slight improvement in overall aerodynamics of the bicycle, and little or no improvement in the aerodynamics of the rider.

The aerodynamic drag, of a body as it moves through the air is comprised of both surface drag, which is the friction of the air as it moves over the surface, and base drag, which is the void or vacuum or wake of turbulent air behind the body. It is apparent, when this principle is applied to cycling, while the afornementioned aerodynamic improvements in components and frames maintain the structural and/or mechanical requirements, they offer only slight improvements in the aerodynamic efficiency of the bicycle, and none lend themselves to accomodate an improvement of the base drag of the body of the rider and frame simultaneously.

SUMMARY OF THE INVENTION

The present invention discloses a low frontal area air channeling adjustable mounting device and saddle assembly that may be installed either permanently on a fiber composite bicycle frame such as the Aero Bicycle Frame II or temporarily on a traditional tube frame.

Said air channeling and adjustable mounting device includes, but is not limited to, an open, hollow, rectangular shaped tube made preferrably of fiber reinforced composite materials, and a rectangular mating telescopic over sleeve preferrably, made of the same said materials; said rectangular tube structure being affixed either to the bicycle frame or underneath the bicycle saddle either permanently or temporarily by means of structural incorporation or a mechanical clamping device or by structural bonding, said hollow tube structure having one or more vertical or generally vertical grooves for vertical adjustments, and said rectangular mating telescopic over sleeve having one or more horizontal grooves for horizontal adjustment, said sleeve being affixed either permanently or temporarily to the bicycle frame or the underneath side of the saddle. Said rectangular tube and over sleeve having a friction type surface on their facing sides and employing a common tightening mechanism, such as, an allen bolt and nut, lock star washer, and flat washer assembly.

The air channeling mounting mechanism is essentially open or hollow, and of low surface area when viewed from a frontal perspective. This allows a positive air flow through its interior and directly into the vacuum or turbulent wake of the rider, thus greatly improving not only the aerodynamic efficiency of the frame, but that of the rider as well.

The positive air flow into the base drag area behind the rider smoothes the air flow and greatly contributes to diminishing the vacuum effect of the wake of the rider as he passes through the air. These and other advantages of the present invention will be apparent from the following description with accompanying drawings, in which designating numerals represent like or similar parts.

BRIEF DISCRIPTION

FIG. 1 is a side exterior view of the aero mount and saddle of the present invention and illustrates the integral saddle and over sleeve of the mechanism as well as the position of the vertical and horizontal adjustment grooves of the over sleeve and open channel tube with their common fastening hardware and how the mechanism may be attached to a composite bicycle frame.

FIG. 2 is a bottom exterior view of the aero mount and saddle of the present invention apart from a bicycle frame and includes said integral saddle and over sleeve and said open channel tube.

FIG. 3 is a rear exterior view of the aero mount and saddle of the present invention and illustrates said saddle and over sleeve and said open tube channel, and illustrates how it may be attached to a composite bicycle frame.

DETAILED DESCRIPTION OF THE INVENTION

Figure 6:
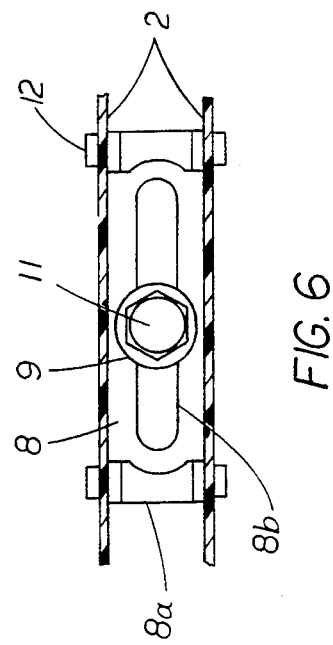
FIG. 6 is a top exterior view of FIG. 5.

The present invention is a low frontal surface area adjustable bicycle saddle mounting mechanism and saddle as is seen in FIGS. 1 through 9 that allows air to be channeled through its interior to the area of turbulent air behind it and/or surrounding bodies. Said adjustable mounting mechanism portion is particularly suitable to be used as a saddle mounting device for a bicycle, but its application is not limited thereto. When employed as a saddle mounting mechanism for a bicycle it may be either permanently or temporarily affixed to the bicycle frame, either by incorporation into the frame structure of a composite bicycle frame, for example, or by mechanical attachment, as in the case of a traditional round tube bicycle frame.

FIG. 1 illustrates the aero mount and saddle of the present invention from a side exterior perspective and shows that the mechanism includes an integrated fiber composite saddle 1, fiber composite over sleeve 2, with a horizontal forward and aft adjustment groove 2a, an open tube post 3, preferably, but not necessarily, of rectangular shape, with vertical adjustment grooves 3a, that is, preferably, but not necessarily made of molded fiber composite material, and affixed directly and permanently to a seat tube of a fiber composite bicycle frame 5 such as Aero Bicycle Frame II. Both said open tube post 3 and over sleeve 2 may also be made of metal or some other suitable material.

Both grooves 2a and 3a may share common fastening hardware 4, which may include four separate units, as in the present schema. Said hardware preferably include an assembly of allen bolts and nuts with lock washers and spacers, and may also include any other suitable fastening means. Loosening said fastening hardware 4 will allow vertical, horizontal, and inclination adjustments for the saddle, and these adjustments can be retained by tightening said hardware.

FIG. 2 is a bottom exterior view of the same aero mount mechanism of the present invention apart from the bicycle frame to which it may be attached, and shows the shape of the bottom of the incorporated composite saddle 1, over sleeve 2, open tube post 3, and the arrangement of the fastening hardware units 4.

FIG. 3 is a back exterior view of the aero mount of the present invention and further shows the possible shape and arrangements of said integrated composite saddle 1, over sleeve 2, open tube post 3, fastening hardware units 4, and the possible seat tube of a composite bicycle frame 5.

The preferred way of making the invention when used in this application includes the molding of said integral saddle and over sleeve, either as separate halves or as separate parts, namely as a saddle and an over sleeve, and then bonding them together either along a common central seam, or at a common joining surface on the bottom of the saddle and the top of said over sleeve. The preferred materials for the molding of the saddle, over sleeve, and open tube post are fiber reinforced composites, that may include, but are not limited to, a suitable plastic resin such as epoxy with carbon fiber and/or kevlar and/or fiberglass, and any combination of these and other suitable fiber reinforced composite materials. Metal and also other plastic systems, such as injection molded plastics, would also work, as well as any combination of these and/or other suitable materials. As stated, said open tube post 3 would be permanently affixed to the seat tube of a fiber reinforced composite bicycle frame, and may either be molded separately and then bonded to said seat tube, or may be incorporated in the construction of said frame.

Figure 4:
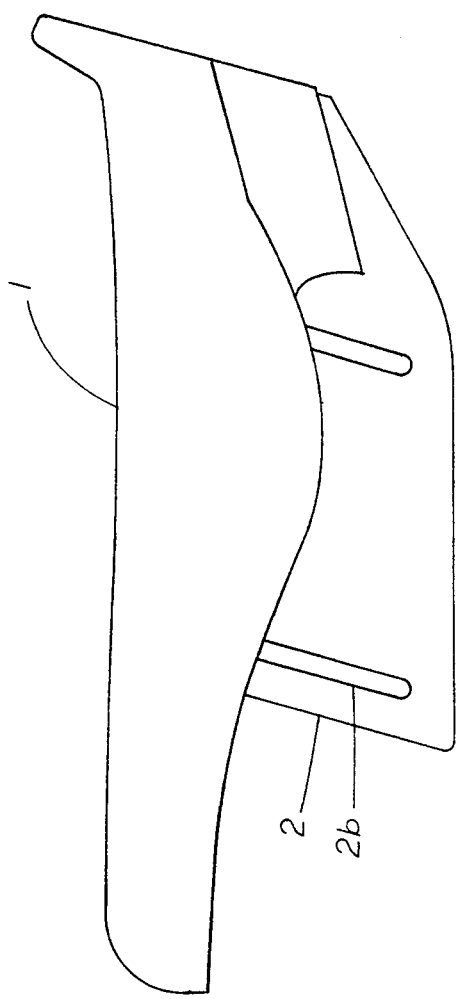
FIG. 4 is a side exterior view of a variation of the over sleeve of the aero mount and saddle of the present invention.
Figure 5:
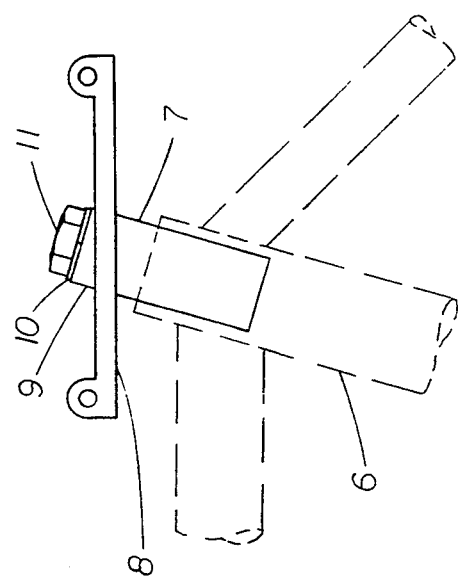
FIG. 5 is a side exterior view of a variation of the under tube mechanism of the aero mount of the present invention as it may be employed in the seat tube of a traditional tube bicycle frame.

FIG. 4 is a side exterior view of the aero mount of the present invention that illustrates the preferred embodiment of the invention when used as a saddle mounting device with a fiber reinforced composite saddle for a traditional tube bicycle frame, and includes an integrated composite saddle 1, over sleeve 2, and vertical grooves 2a, and illustrates a variation of the mounting schema thereof. This schema, which is further clarified in FIGS. 5 and 6, replaces the vertical grooves 3b on said open tube post 3 with vertical grooves 2a of over sleeve 2, and also replaces open tube post 3 of FIG. 1, with the mounting schema shown in FIG. 5, wherein the saddle mounting mechanism 8 may be adapted for a traditional bicycle seat tube 6, as shown, by means of seat post 7, clamping wedge 9, lock washer 10, and clamping bolt 11. Said saddle mounting mechanism 8 may also be affixed directly to the top of a seat tube of a fiber composite bicycle frame either by a mechanical means or by an adhesive bond or any combination thereof.

FIG. 6 is a top exterior view of the adaptation mechanism of the present invention and further illustrates the arrangement of said parts thereof, including clamping bolt 11, clamping wedge 9, frame mounting plate 8, with horizontal adjustment groove 8b, threaded bolt rods 8a, saddle fastening and adjustment hardware 12, and over sleeve 2. It is preferred that the adaptation mechanism be made of separate milled metal parts and assembled as shown. This metal adaptation mechanism illustrates the preferred embodiment if the aero mount were employed on a traditional tube frame.

Figure 7:
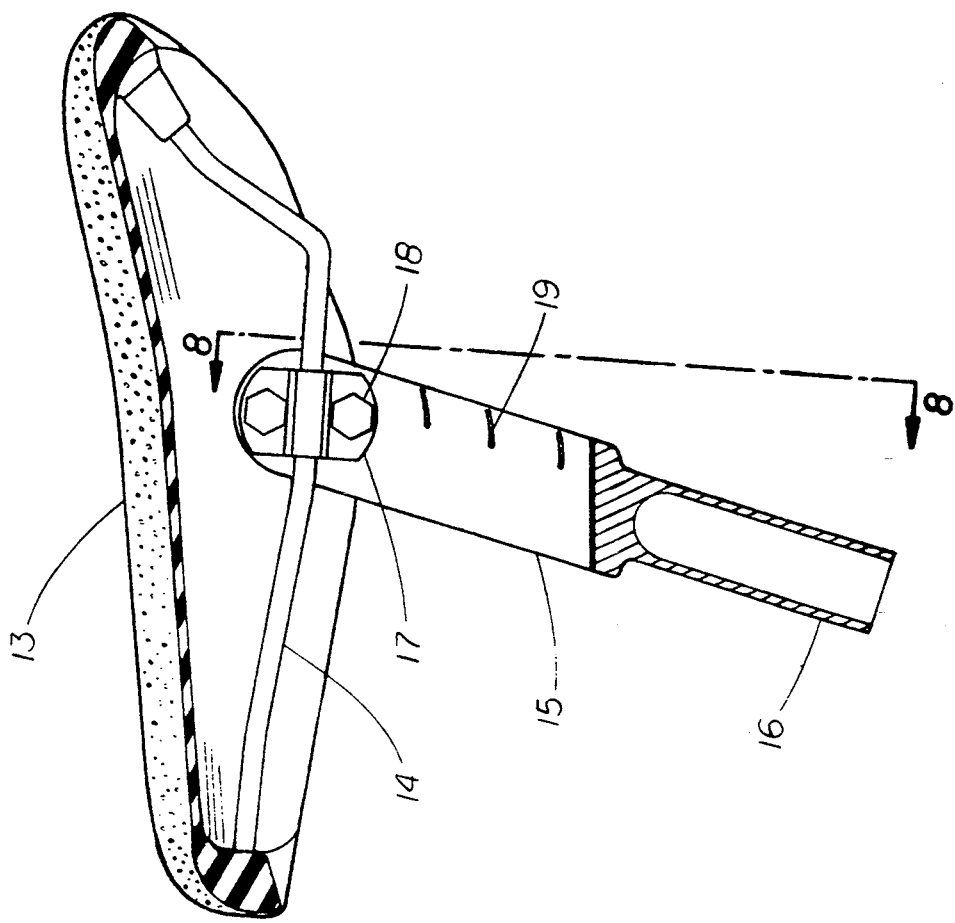
FIG. 7 is a side split view of a variation of the aero mount of the present invention that utilizes a traditional bicycle saddle wherein vertical and horizontal adjustment is achieved in the same manner as a traditional seat post, and includes mounting hardware, and wherein lateral stiffening fins are added.

FIG. 7 illustrates a variation of the aero mount of the present invention from a side split perspective and includes the use of a traditional bicycle saddle 13, with seat mounting rails 14, open seat post 15, cylindrical portion of seat post 16, clamp 17, clamping bolts, washers, and nuts 18, and fins 19. In this schema, the vertical height adjustment is achieved in the same way as for a traditional seat post, and the horizontal adjustment forward and aft is also achieved in a similar way to that of a traditional seat post clamp. The inclination of the saddle is adjusted by loosening the lower mounting bolt 18 and swinging clamp 17 forward or backwards. The open seat post as a whole may be made of metal as a complete casting, or may be welded or brazed together, and fins 19 serve as a stiffening means between open seat post halves 15 and may be included in the casting process or may be added later, either by an adhesive bond, or by brazing or welding. One or more of said fins 19 may also be used in said preferred embodiments for over sleeve type construction shown in FIGS. 1 through 3 for a fiber composite frame, and in FIGS. 4 through 6 for a traditional tube frame.

Figure 8:
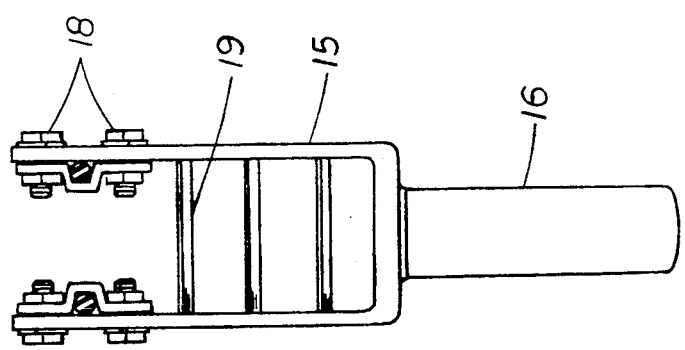
FIG. 8 is a rear view of the aero mount of FIG. 7 wherein the saddle is eliminated and the saddle rails are shown by way of a section view.

FIG. 8 is a rear view of the open seat post configuration of the aero mount of the present invention illustrated in FIG. 7 wherein said traditional bicycle saddle 13 is not shown. Said seat mounting rails 14, said open seat post 15, said cylindrical portion of seat post 16, said clamp 17, said clamping bolts, washers and nuts 18, and fins 19 are illustrated by way of a rear view, with said seat mounting rails 14 being illustrated by way of a section view.

Figure 9:
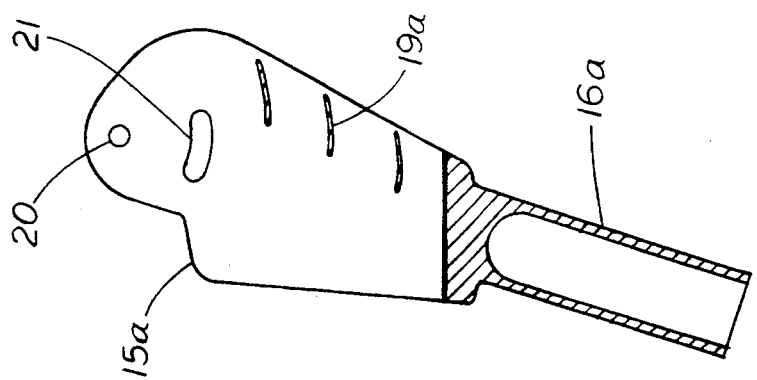
FIG. 9 is a side split view of a variation of the aero mount of the present invention similar to the variation of FIG. 7 without the accompanying traditional bicycle saddle and mounting hardware.

FIG. 9 is a side split view of a variation of the open seat post configuration of the aero mount of the present invention illustrated in FIG. 8, wherein said open seat post section 15 is varied in shape to open seat post section 15a, said cylindrical portion of seat post 16a also being varied to accomodate 15a. Said fins 19 are varied in this schema to the arrangment 19a. The hole 20 and groove 21 are shown in this perspective without said clamp 17 and said clamping bolts, washers, and nuts 18, to more fully show the shape of the saddle inclination adjustment groove 21.

The aero mount of the present invention may also be used in other applications other than a bicycle saddle mount, and it would be appreciated that it be understood that any variation, alteration, adaptation, and/or modification of the aero mount of the present invention and its construction that may appear to someone skilled in the art and/or related arts, as well as various alternative applications thereof are considered to be within the scope of the present invention as are delineated in the following claims.

The embodiments of the invention in which an exclusive property or privilege is claimed are defined as follows:

1. An open air duct bicycle saddle adjustable mounting device including; a base mounting support means; vertical support means comprised of two vertical structural elements extending perpendicularly upwards from outside edges of said base mounting support means, said vertical structural elements supporting a bicycle saddle at their upper ends, and being spaced and shaped to form a hollow air duct when viewed from a frontal cross-section view, specifically to receive and direct forward air flow into the turbulent wake of a rider; said vertical structural elements having at their upper ends a mounting surface for said bicycle saddle, fastening means for said bicycle saddle, and adjustment means for vertical, horizontal, and inclination adjustment of said bicycle saddle.

2. The open air duct bicycle saddle mounting device of claim 1, wherein said base mounting support means is comprised of a seat post with interior threads, a frame mounting plate with a horizontal groove in its interior for horizontal adjustments, and bolt, wedge, and lock washer assembly, and wherein said frame mounting plate has lugs and fasteners for attachment of said vertical structural elements, and wherein said vertical structural elements consist of side walls of an inverted u-shaped, elongated, telescopic, air duct sleeve with two vertical grooves mounting plate, and wherein said saddle and inverted, u-shaped, elongated, telescopic, air duct sleeve are made of one of the following materials, including: metal, fiber reinforced composites, and injected molded plastic, and any combination thereof; and wherein said adjustment means for vertical adjustment of said structurally integrated bicycle saddle consists in the sliding of said seat post in the seat tube of a bicycle frame and clamping said seat post in its proper position and in sliding said inverted, u-shaped, elongated, telescopic, air duct sleeve along said two vertical grooves relative to said base mounting plate and fastening said inverted, u-shaped, elongated, telescopic, air duct sleeve in its proper position with said fasteners, and wherein horizontal adjustment means consists in moving said base mounting plate along said horizontal groove and then fastening said base mounting plate in its proper position with said bolt, wedge, and lock washer assembly, and wherein said inclination adjustment means consist in making independent adjustments of said inverted, u-shaped, elongated, telescopic, air duct sleeve along one of said vertical grooves and then fastening said inverted, u-shaped, elongated, telescopic sleeve in its proper position.

3. The open air duct bicycle saddle mounting device of claim 1, wherein said base mounting support means is adapted for use on a custom fiber composite frame, wherein a frame mounting plate is mounted directly to a mating mounting surface.

4. The open air duct bicycle saddle mounting device of claim 2, wherein the cross-sectional shape of said seat post of said base mounting support means is varied to an aerodynamic cross-section including an elliptical and a tear drop cross-section and as necessary to fit the seat tube of any bicycle requiring a seat post.

5. The open air duct bicycle saddle mounting device of claim 2, wherein said base mounting support means consists of a seat post to which said hollow air duct is affixed, said vertical structural elements having at each of their upper ends a mounting surface and bracket and bolt fastening means for fastening said bicycle saddle to said mounting surface and wherein said adjustment means for vertical adjustment consists in sliding said seat post in a seat tube of a bicycle frame and clamping said seat post in its proper position, and wherein said adjustment means for horizontal adjustment consists in sliding mounting rails of said bicycle saddle in brackets and clamping them in their proper position, and wherein adjustment means for said inclination adjustment comprises an elongated slot formed in each of the mounting surfaces, lower bolt of said bracket and bolt fastening means may be adjustably clamped along said slot to its proper position, and wherein internal stiffening fins may be added to said hollow air duct and added thereto.

6. The open air duct bicycle saddle mounting device of claim 5, wherein said saddle is of a shape to enhance air flow and may be made of one of: fiber reinforced composites, and injected molded plastic.

7. The open air duct bicycle saddle mounting device of claim 1 wherein said bicycle mounting device may be made of the following materials; fiber reinforced composites, metal, injection molded plastic, and any combination thereof.

8. An open air duct bicycle saddle mounting device and structurally integrated bicycle saddle, including a base mounting support means consisting of an outer surface of a lower horizontal wall of an open, rectangular, elongated, air duct, affixed to a mating surface of a finer composite bicycle frame by one of: structural incorporation, adhesive band and mechanical fasteners, and any combination thereof; said air duct including a pair of spaced vertical sides extending upwardly from said lower horizontal wall and a top horizontal wall extending across the upper ends of the vertical sides; a vertical support means consisting of the vertical side and said top horizontal wall of said open, rectangular, elongated, air duct and a mating inverted u-shaped, telescopic over-sleeve fastened to said open, rectangular, elongated air duct; adjustment means to accomodate vertical, horizontal and inclination adjustments consisting of two vertical groves in the vertical sides of said open, rectangular, elongated, air duct, and a horizontal groove in the vertical sides of said mating, inverted, u-shaped, telescopic over-sleeve, with common fastening means at their overlapping points; a mounting surface and attachment means for said structurally integrated bicycle saddle: and wherein the underneath of said structurally integrated bicycle saddle is shaped to enhance air flow, and wherein internal stiffening fins may be added to the inside of said open, rectangular, elongated, air duct and said mating, inverted, u-shaped, telescopic over-sleeve to further enhance and direct air flow into the turbulent wake of a rider.

9. The open air duct bicycle saddle mounting device and structurally integrated bicycle saddle of claim 8 wherein said bicycle saddle, said open, rectangular, elongated, air duct, and said mating inverted u-shaped telescopic over-sleeve are made of one of the following materials; fiber reinforced composites, metal, injection molded plastic, and any combination thereof.

* * * * *